United States Patent [19]
Nishiguchi et al.

[11] Patent Number: 5,218,844
[45] Date of Patent: Jun. 15, 1993

[54] ABSORPTION HEAT PUMP APPARATUS WITH INDOOR AND OUTDOOR HEAT EXCHANGERS

[75] Inventors: Akira Nishiguchi, Ushiku; Tomihisa Ohuchi, Tsukuba; Seiichiro Sakaguchi; Daisuke Hisajima, both of Ibaraki; Michihiko Aizawa, Ushiku, all of Japan

[73] Assignee: Hitachi, Ltd., Tokyo, Japan

[21] Appl. No.: 653,363

[22] Filed: Feb. 11, 1991

[30] Foreign Application Priority Data

Feb. 9, 1990 [JP] Japan .................................. 2-028281

[51] Int. Cl.$^5$ .............................................. F25B 15/00
[52] U.S. Cl. .................................. 62/476; 62/238.3; 62/482; 237/2 B
[58] Field of Search ............... 62/476, 238.3, 482; 165/62; 237/2 B

[56] References Cited

U.S. PATENT DOCUMENTS

| | | | |
|---|---|---|---|
| 3,527,060 | 9/1970 | Kruggel | 62/476 |
| 4,368,624 | 1/1983 | Takeshita | 62/476 |
| 4,475,361 | 10/1984 | Alefeld | 62/476 |
| 4,719,767 | 1/1988 | Reid, Jr. et al. | 62/476 |

FOREIGN PATENT DOCUMENTS 61-168758 7/1985 Japan .
60-245973 12/1985 Japan .

*Primary Examiner*—John M. Sollecito
*Attorney, Agent, or Firm*—Antonelli, Terry, Stout & Kraus

[57] ABSTRACT

An absorption heat pump apparatus is so formed that solution which has absorbed coolant vapor in absorber to increase in temperature, liquid coolant into which coolant vapor heat been condensed in a condenser, and coolant which has decreased in temperature through flash evaporation of coolant vapor in an evaporator are delivered directly to heat exchangers so as to exchange heat with the outdoor air, respectively. This arrangement makes the use of cold water and cooling water as well as equipment therefor and maintenance thereof unnecessary.

13 Claims, 4 Drawing Sheets

ABSORPTION HEAT PUMP APPARATUS WITH INDOOR AND OUTDOOR HEAT EXCHANGERS

BACKGROUND OF THE INVENTION

1. Field of the Invention

The present invention relates to an absorption the heat pump apparatus which absorbs heat of the indoor air and releases the heat into the outdoor air when the apparatus is in cooling operation and which absorbs the heat of the outdoor air and releases the heat into the indoor air when the apparatus is in heating operation.

2. Description of the Related Art

In a conventional apparatus, as disclosed in Japanese Patent Unexamined Publication No. 60-245973, piping arrangements for cooling water and cold water are provided to connect with an absorber, a condenser and an evaporator so that the cooling operation and the heating operation can be switched over to the other by the use of these piping arrangements in different manners for the respective operations.

Alternatively, as disclosed in Japanese Patent Unexamined Publication No. 61-168758, there are provided an air-cooled condenser for the cooling operation and a water-cooled condenser for the heating operation, and an air-cooled heat exchanger and a water-cooled heat exchanger are provided and connected with each other through vapor passages to serve as an evaporator and an absorber. These components are switched over in usage in such a manner that, during the cooling operation, the water-cooled heat exchanger serves as the evaporator and the air-cooled heat exchanger serves as the absorber, and that, during the heating operation, the air-cooled heat exchanger serves as the evaporator and the water-cooled heat exchanger serves as the absorber.

In the conventional apparatus disclosed in Japanese Patent Unexamined Publication No. 60-245973, the piping arrangements required for cooling water and cold water are required, gives rise to a problem that it takes much time and much labor to perform the maintenance of the water or these piping arrangements. Further, the apparatus is low in thermal efficiency because the heat is indirectly transferred by means of water, and has a defect that the cooling and heating operations cannot be effected simultaneously because the piping arrangements are used for either the cooling operation or the heating operation at on time.

In the other conventional apparatus disclosed in Japanese Patent Unexamined Publication No. 61-168758, the different condensers are required respectively for the cooling operation and the heating operation, and consequently, it is necessary to switch the vapor conduits of large cross-sectional areas with one another, resulting in a problem that the whole apparatus is large in size. Besides, the absorber and the evaporator are replaced with each other to switch the cooling operation and the heating operation with each other, so that their performances are inferior to those of heat exchangers which are used for an exclusive purposes, and that the cooling and heating operations cannot be performed simultaneously.

In addition, in either conventional apparatus described above, a flowing liquid screen of solution or coolant is formed in each of the absorber, the condenser and the evaporator, and the coolant vapor is absorbed by or condensed on the liquid screen, or the coolant vapor is evaporated from the liquid screen. Accordingly, efficiency of the heat exchange is dependent on the thickness of the liquid screen and the flowing velocity thereof, and it is difficult to improve the capabilities of these devices, whereas the whole apparatus unfavorably is large in size.

SUMMARY OF THE INVENTION

An object of the present invention is to provide an absorption heat pump apparatus which does not require the maintenance of the cold water and the cooling water, which is highly efficient in heat exchange, which is small in size, which enables the cooling operation and the heating operation to be easily switched with each other, and which also enables both the cooling and the heating operations to be readily completed at the same time.

In order to achieve the above-described object, according to the invention, the release of heat at an absorber and a condenser and absorption of heat at an evaporator are carried out without cooling water and cold water. Instead of the water, solution which has absorbed coolant vapor in the absorber to increase in temperature is directly delivered to an air-cooled heat exchanger to be cooled and then is returned to the absorber again. Coolant vapor is condensed into liquid coolant in the condenser, and the liquid coolant which has increased in temperature is directly delivered to an air-cooled heat exchanger to be cooled, and then is returned to the condenser again. Liquid coolant whose temperature is higher than the saturation temperature corresponding to the pressure within the evaporator is sprinkled in the evaporator for the flash evaporation to decrease the temperature of the liquid coolant itself, and the liquid coolant which has been lowered in temperature is directly delivered to an air heat exchanger to absorb the heat of the outdoor air, and then is returned to the evaporator again.

Moreover, in order to facilitate the of the cooling operation and the heating operation to each other, at least two air-cooled or air heat exchangers are provided for each of the absorber, the condenser and the evaporator. One of the heat exchangers is installed outdoors, while another of the heat exchangers is installed indoors, and valves are provided in piping arrangements which respectively connect these heat exchangers to the absorber, the condenser or the evaporator, and a pump. Thus, when these valves are selectively operated, the heat exchanger to be actuated can be selected. Furthermore, the cooling and the heating operations can be simultaneously effected easily by the switchover of the above-mentioned valves.

The absorption heat pump apparatus of the above-described structure has the following function.

The solution of the absorber and the liquid coolant of the condenser are directly delivered to the air-cooled heat exchangers and cooled, and the liquid coolant of the evaporator is directly delivered to the air heat exchanger to absorb the heat. Thus, it is not required to use cold water and cooling water, and the associated equipment thereof and its maintenance become unnecessary. Further, heat is transferred without cold water and cooling water, and consequently, the efficiency in heat exchange is improved, while the size of the whole apparatus is reduced.

Besides, the coolant vapor is absorbed by the solution in the absorber, and the solution which has increased in temperature is cooled in the air-cooled heat exchanger. With this arrangement, thermal conductivity can be readily improved by increasing the flowing velocity of the solution in the air-cooled heat exchanger, to reduce the size of the absorber as a whole. As for the condenser, similarly, because the place where coolant vapor is condensed into coolant liquid is separated from the air-cooled heat exchanger where the coolant liquid which has increased in temperature is cooled, it is easy to improve thermal conductivity of coolant in the air-cooled heat exchanger and to reduce the size of the condenser. Also in the case of the evaporator, the place where coolant decreases in temperature through flash evaporation is separated from the air heat exchanger where the liquid coolant of low temperature absorbs heat from the outdoor air, and accordingly, it is easy to improve thermal conductivity of coolant in the air heat exchanger and to reduce the size of the evaporator.

In addition, when selectively switching the valves the solution of the absorber and the liquid coolant of the condenser are delivered to the air-cooled heat exchangers installed outdoors, and the liquid coolant of the evaporator is delivered to the air heat exchanger installed indoors, to conduct the cooling operation, or the solution of the absorber and the liquid coolant of the condenser are delivered to the air-cooled heat exchangers installed indoors, and the liquid coolant of the evaporator is delivered to the air heat exchanger installed outdoors, to conduct the heating operation. In this manner, the cooling operation and the heating operation can be readily switched with each other. Also, both the cooling and heating operations can easily be performed at the same time.

DESCRIPTION OF PREFERRED EMBODIMENTS

Figure 1:
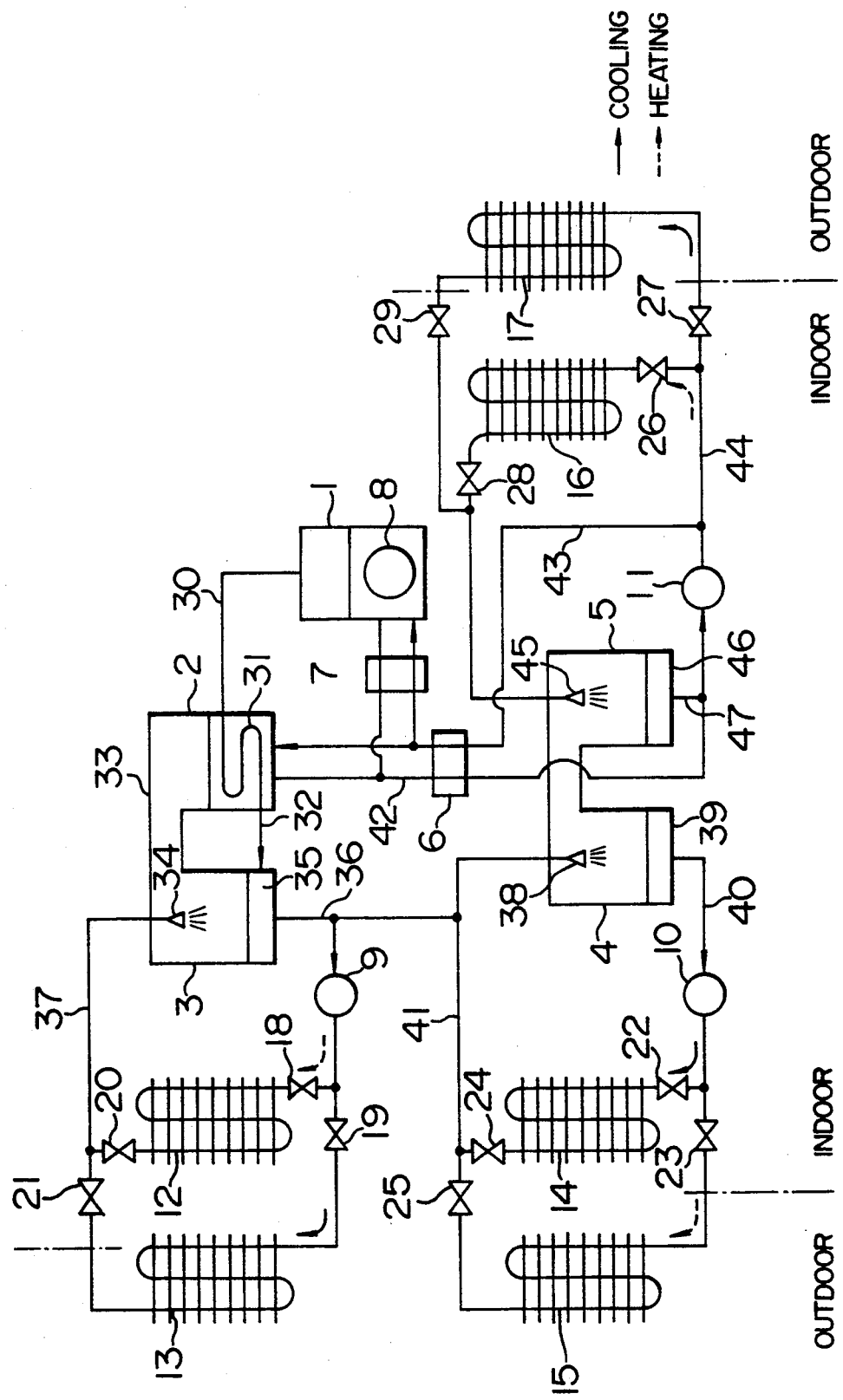
FIG. 1 is a system diagram showing an embodiment of the invention.

An embodiment of the invention will now be described with reference to FIG. 1. As shown in this figure, an absorption heat pump apparatus comprises a high-temperature regenerator 1, a low-temperature regenerator 2, a condenser 3, an evaporator 4, an absorber 5, a primary solution heat exchanger 6, a secondary solution heat exchanger 7, a burner 8, a coolant pump 9 for the condenser, a coolant pump 10 for the evaporator, a solution pump 11 for the absorber, an indoor air cooled heat exchanger 12 for the condenser, an outdoor air-cooled heat exchanger 13 for the condenser, an indoor air heat exchanger 14 for the evaporator, an outdoor air heat exchanger 15 for the evaporator, an indoor air-cooled heat exchanger 16 for the absorber, an outdoor air-cooled heat exchanger 17 for the absorber, and valves 18 to 29. When lithium bromide solution of the high-temperature regenerator 1 is heated by the burner 8, the solution is concentrated while generating coolant vapor. The coolant vapor thus generated is supplied through a coolant line 30 to a heater tube 31 of the low-temperature regenerator 2. When lithium bromide solution of the low-temperature regenerator 2 is heated by the heater tube 31, the solution is concentrated with generating coolant vapor, and the coolant vapor within the heater tube 31 is condensed and liquefied. The coolant vapor generated in the low-temperature regenerator 2 is introduced through a coolant passage 33 to the condenser 3 where it is condensed by liquid coolant, which is sprinkled from a coolant sprinkler 34, and then collects in a coolant pool 35. On the other hand, the coolant liquid which has condensed and liquefied within the heater tube 31 of the low-temperature regenerator 2 is delivered through a coolant passage 32 so as to join the coolant liquid in the coolant pool 35 within the condenser 3. Through a coolant passage 36, part of the liquid coolant of the coolant pool 35 is delivered to the evaporator 4, and the rest of the same is delivered to the coolant pump 9. During cooling operation, the valves 18, 20 are closed, while the valves 19, 21 are open, so that the coolant liquid supplied from the coolant pump 9 passes through the valve 19, releases heat and is cooled at the outdoor air-cooled heat exchanger 13 for the condenser, returns to the condenser 3 via the valve 21 and through a coolant passage 37, and is sprinkled from the coolant sprinkler 34. During the heating operation, the valves 18, 20 are open, while the valves 19, 21 are closed, so that the coolant liquid supplied from the coolant pump 9 passes through the valve 18, releases heat at the indoor air-cooled heat exchanger 12 for the condenser to heat the indoor air, returns to the condenser 3 via the valve 20 and through the coolant passage 37, and is sprinkled from the coolant sprinkler 34. Meanwhile, the liquid coolant delivered toward the evaporator 4 joins liquid coolant which is supplied from the air heat exchanger 14 or 15 for the evaporator, and is then introduced into a coolant sprinkler 38 within the evaporator. Since the pressure within the evaporator 4 is kept low, the coolant liquid sprinkled from the coolant sprinkler 38 effects flash evaporation to make the temperature of the coolant liquid itself decrease, and collects in a coolant pool 39. The coolant liquid of the coolant pool 39 is delivered to the coolant pump 10 through a coolant passage 40. During the cooling operation, the valves 22, 24 are open, while the valves 23, 25 are closed, so that the coolant liquid supplied from the coolant pump 10 passes through the valve 22, absorbs heat at the indoor air heat exchanger 14 for the evaporator to cool the indoor air, flows via the valve 24 and through a coolant passage 41, joins the liquid coolant fed from the condenser 3, and is introduced into the coolant sprinkler 38. During the heating operation, the valves 22, 24 are closed, while the valves 23, 25 are open, so that the coolant liquid supplied from the coolant pump 10 passes through the valve 23, absorbs heat and increases in temperature at the outdoor air heat exchanger 15 for the evaporator, flows via the valve 25 and through the coolant passage 41, joins the liquid coolant fed from the condenser 3, and is introduced into the coolant sprinkler 38.

In the secondary solution heat exchanger 7, the solution concentrated in the high-temperature regenerator 1 is cooled when it exchanges heat with dilute solution fed from the absorber 5. After the heat exchange, it joins the solution concentrated in the low-temperature regenerator 2, and is delivered through a solution passage 42 to the primary solution heat exchanger 6. In this primary solution heat exchanger 6, the solution is cooled when it exchanges heat with dilute solution fed from the absorber 5, and then, it is mixed with solution supplied from the absorber 5 so as to be delivered to the pump 11. Part of the solution fed from the pump 11 branches off to a passage 43 for the high-temperature regenerator 1 and the low-temperature regenerator 2, and the rest of the solution flows through a solution passage 44. During the cooling operation, the valves 26, 28 are closed, while the valves 27, 29 are open, so that the solution of the passage 44 passes through the valve 27, releases heat and is cooled at the outdoor air-cooled heat exchanger 17 for the absorber, and is introduced via the valve 29 to a solution sprinkler 45 within the absorber. During the heating operation, the valves 26, 28 are open, while the valves 27, 29 are closed, so that the solution in the passage 44 passes through the valve 26, releases heat at the indoor air-cooled heat exchanger 16 for the absorber to heat the indoor air, and is introduced via the valve 28 to the solution sprinkler 45 within the absorber 5. The solution sprinkled from the solution sprinkler 45 absorbs the coolant vapor supplied from the evaporator 4 and increases in temperature, collects in a solution pool 46, flows through a solution passage 47, joins the solution in the solution passage 42, and is delivered to the solution pump 11. On the other hand, the solution fed from the solution pump 11 and branching to the solution passage 43 cools a mixture of the solution from the high-temperature regenerator 1 and the solution from the low-temperature regenerator 2 in the primary solution heat exchanger 6. After the cooling, part of the solution is delivered to the low-temperature regenerator 2, and the rest of the solution cools the solution from the high-temperature regenerator 1 in the secondary solution heat exchanger 7 before being delivered to the high-temperature regenerator 1. If each pair of the valves 18 and 19, 20 and 21, 22 and 23, 24 and 25, 26 and 27, and 28 and 29 is replaced with a three-way valve, it will be easier to switch the flow course and control the flow rate.

As described above, according to this embodiment, the absorption heat pump apparatus can be realized without the use of cold water or cooling water so that maintenance of cold water or cooling water may be unnecessary, and also, heat exchange can be performed with high thermal efficiency because heat is transferred directly to the air heat exchangers and the air-cooled heat exchangers by means of coolant and solution. As for the air-cooled heat exchangers, heat conductivity can be improved by increasing the flow velocity of solution or coolant, thus reducing the size of the heat Pump apparatus as a whole. Further, when the valves provided in the solution and coolant passages are opened/closed, the cooling operation and the heating operation can be readily switched over to each other. Besides, both the cooling and heating operations can be conducted at the same time by actuating the indoor heat exchangers simultaneously.

Moreover, it is indoor air-cooled heat exchanger for the absorber, the indoor air-cooled heat exchanger for the condenser, and the indoor air heat exchanger for the evaporator of this embodiment are provided in plural with inlet and outlet valves, the cooling/heating operation can be conducted for a plurality of rooms.

In the description of other embodiments which will be made hereinafter, component parts identical in function to those of the first embodiment will be denoted by the same reference numerals and explanation thereof will be omitted.

Figure 2:
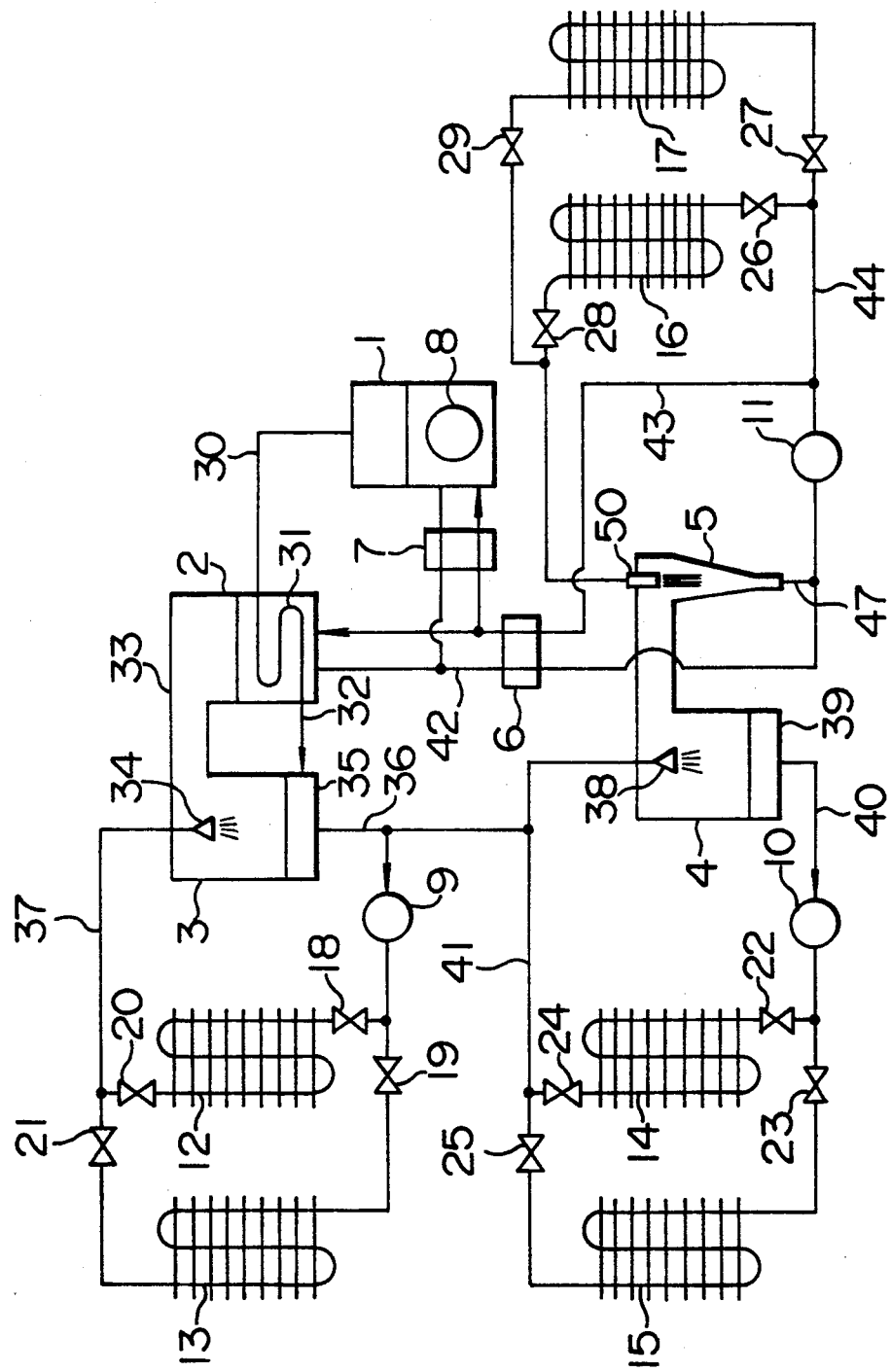
FIG. 2 is a system diagram showing another embodiment of the invention.

FIG. 2 illustrates another embodiment of the invention. The present embodiment is different from the embodiment shown in FIG. 1 in that a solution jet nozzle 50 is provided within the absorber 5 in place of the solution sprinkler 45, and that the absorber 5 is so shaped as to have a cross-sectional area which gradually decreases along a direction of the jet discharged at high pressure from the solution jet nozzle 50.

In addition to the effects of the first embodiment, this embodiment brings about an effect that, because solution is discharged at high pressure from the solution jet nozzle 50, particles of the jetted solution are finer to increase the area of the interface between the liquid solution and the gaseous solution, thereby enhancing the capability of absorption of coolant vapor. Further, another effect is brought about that, since the cross-sectional area of the absorber 5 is reduced according as absorption of the coolant vapor progresses, the coolant vapor increases in pressure so that it may be absorbed by the solution more easily.

The structure of the absorber 5 with the solution jet nozzle 50 described above may be applied also to the condenser 3. In this case, the same effects can be obtained.

Figure 3:
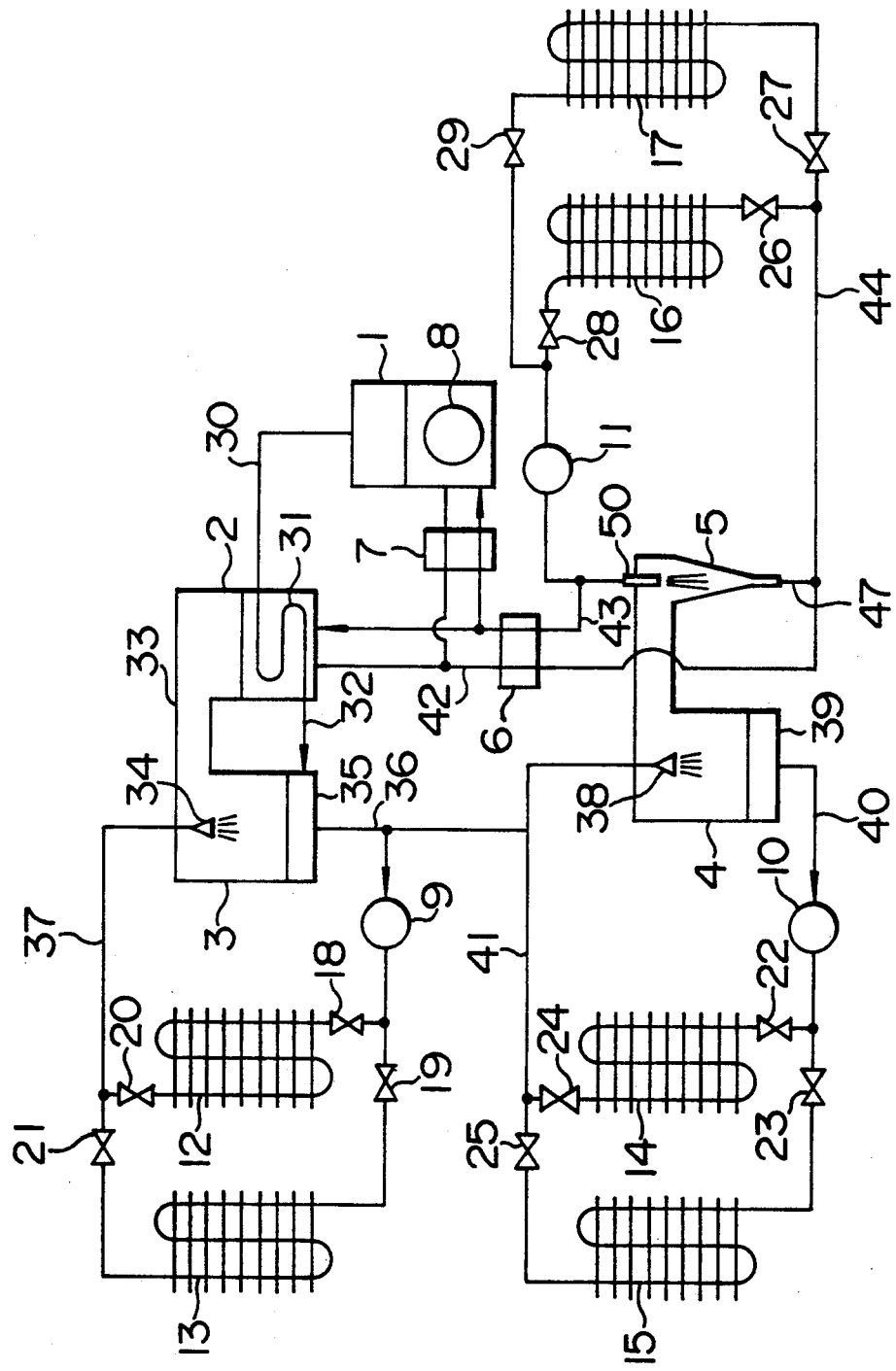
FIG. 3 is a system diagram showing still another embodiment of the invention.

FIG. 3 illustrates still another embodiment of the invention. This embodiment is different from the embodiment shown in FIG. 2 in that the solution from the absorber 5 and the solution from the high-temperature regenerator 1 and the low-temperature regenerator 2 do not pass through a solution pump first but flow through the indoor air-cooled heat exchanger 16 or the outdoor air-cooled heat exchanger 17, and then, is delivered to the solution pump 11, and that part of the solution fed from the solution pump 11 is delivered through the solution passage 43 to the high-temperature regenerator 1 and the low-temperature regenerator 2, while the rest of the solution is delivered to the solution jet nozzle 50

This embodiment is more effective in that, because the solution is discharged at higher pressure from the solution jet nozzle 50, even coolant vapor which has not been absorbed in the absorber 5 can be carried by the solution so as to flow through the solution passage 44 and be delivered to the indoor air-cooled heat exchanger 16 or the outdoor air-cooled heat exchanger 17 where the coolant vapor is absorbed by the solution while being cooled, thus enhancing the capability of absorption.

The above structure may be applied also to the condenser 3 to obtain the same effects.

Figure 4:
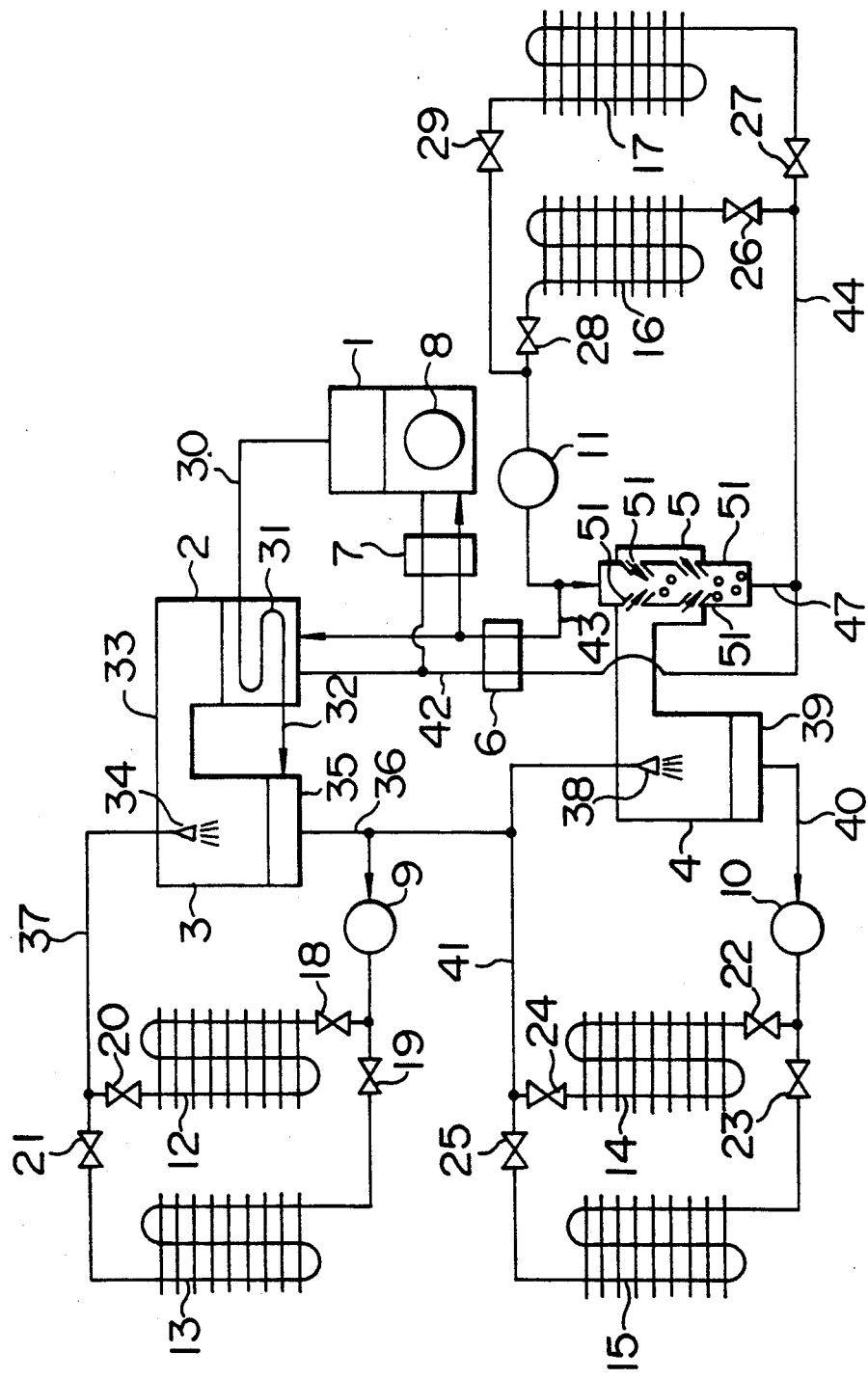
FIG. 4 is a system diagram showing further another embodiment of the invention.

FIG. 4 illustrates further another embodiment of the invention. This embodiment is different from the embodiment shown in FIG. 3 in that the absorber 5 is so formed as to have openings 51 for allowing coolant vapor to flow into a stream of the solution within the absorber 5 so that it has a two-phase flow condition for absorbing the coolant vapor.

This embodiment brings about an effect that the coolant vapor which has been carried by the solution but which has not been absorbed due to its over-saturation state is delivered to the indoor air-cooled heat exchanger 16 or the outdoor air-cooled heat exchanger 17 where the coolant vapor is absorbed while being cooled, thereby enhancing the capability of absorption.

This structure may be applied also to the condenser 3 to obtain the same effects.

What is claimed is:

1. An absorption heat pump apparatus comprising an evaporator, an absorber, a plurality of regenerators and a condenser to absorb heat of indoor air and to release the heat into outdoor air during a cooling operation, and to absorb heat of the outdoor air and releases the heat into the indoor air during a heating operation, wherein said absorber is provided to cause coolant vapor from said evaporator to be absorbed by solution, and wherein the absorption heat pump apparatus further includes at least two heat exchangers provided to respectively cool the solution, and said heat exchangers are operatively connected in parallel with one another with said absorber through piping including means for delivering the solution.

2. The absorption heat pump apparatus according to claim 1, wherein one of said heat exchangers is installed outdoors, and another of said heat exchangers in installed indoors, said heat exchangers being operatively connected in parallel with said absorber by said piping including said delivery means for delivering the solution.

3. The apparatus according to claim 1, wherein a nozzle for discharging the solution in a state of a jet is provided in said absorber.

4. The apparatus according to claim 1, wherein openings are formed within said absorber to discharge the coolant vapor into the solution.

5. The apparatus according to claim 4, further comprising one of means for switching flow course of the solution and means for controlling flow rate of the solution, said one of said switching means and said controlling means being provided in said piping which connects said absorber, said delivery means and a plurality of heat exchangers with one another.

6. An absorption heat pump apparatus comprising an evaporator, an absorber, a plurality of regenerators and a condenser to absorb heat of indoor air and to release the heat into outdoor air during a cooling operation, and to absorb heat of the outdoor air and to release the heat into the indoor air during a heating operation, wherein said condenser condenses coolant vapor from said regenerators into liquid coolant, and wherein said absorption heat pump apparatus further comprises at least two heat exchangers provided to cool the liquid coolant, and wherein said heat exchangers are operatively connected in parallel with one another and with said condenser through piping including means for delivering the liquid coolant.

7. The absorption heat pump apparatus according to claim 6, wherein one of said heat exchangers is installed outdoors, and another of said heat exchangers is installed indoors, said heat exchangers being operatively connected in parallel with said condenser by said piping including said delivery means for the delivery of the liquid coolant.

8. The absorption heat pump apparatus according to claim 7, said absorption heat pump apparatus further comprising one of means for switching a flow of the liquid coolant or means for controlling a flow rate of the liquid coolant, said one of said switching means or said controlling means being provided in said piping connecting said condenser, said delivery means and a plurality of heat exchangers with one another.

9. An absorption heat pump apparatus comprising an evaporator, an absorber, a plurality of regenerators and a condenser to heat indoor air and to release the heat into outdoor air during a cooling operation, and to absorb heat of the outdoor air and to release the heat into the indoor air during a heating operation, wherein said evaporator evaporates liquid coolant, and wherein said absorption heat pump further comprises at least two heat exchangers absorb heat of the outdoor air by the liquid coolant, and wherein said heat exchangers are operatively connected in parallel with one another with said evaporator through piping including means for delivering the liquid coolant.

10. The absorption heat pump apparatus according to claim 9, wherein one of said heat exchangers is installed outdoors, and another of said heat exchangers is installed indoors, said heat exchangers being operatively connected in parallel to each other with said evaporator by said piping including said delivery means for delivering the liquid coolant.

11. The absorption heat pump apparatus according to claim 10, further comprising one of means for switching a flow of the liquid coolant or means for controlling a flow rate of the liquid coolant, said one of said switching means or said controlling means being provided in said piping connecting said evaporator, said coolant delivery means and said heat exchangers with one another.

12. An absorption heat pump apparatus comprising an evaporator, an absorber, a plurality of regenerators and a condenser to absorb heat of indoor air and to release the heat into outdoor air during a cooling operation, and to absorb heat of the outdoor air and to release the heat into the indoor air during a heating operation, wherein said condenser condenses coolant vapor from said regenerators into liquid coolant, and wherein said absorption heat pump apparatus further comprises a first heat exchanger and a second heat exchanger to cool the liquid coolant, and wherein said condenser, said first heat exchanger and said second heat exchanger are operatively connected with one another through piping including means for delivering the liquid coolant, and wherein said evaporator evaporates the liquid coolant, and wherein said first heat exchanger and said second heat exchanger absorbs heat of the outdoor air through the liquid coolant, and wherein said first heat exchanger and said second heat exchanger for heat absorption of the liquid coolant are operatively connected in parallel with one another with said evaporator through another piping including another means for delivering the liquid coolant.

13. An absorption heat pump apparatus comprising an evaporator, an absorber, a plurality of regenerators and a condenser to absorb heat of indoor air and to release the heat into outdoor air during a cooling operation, and to absorb heat to the outdoor air and releases the heat into the indoor air during a heating operation, and wherein said absorber absorbs coolant vapor by solution from said evaporator, and wherein said absorption heat pump apparatus further comprises a first heat exchanger and a second heat exchanger to cool the solution, and wherein said first heat exchanger and second heat exchanger are operatively connected in parallel with one another with said absorber through piping including means for delivering the solution, and wherein one of said first heat exchanger and said second heat exchanger is installed outdoors and another of said first heat exchanger or said second heat exchanger is installed indoors, and wherein said condenser condenses coolant vapor from said regenerators into liquid coolant, wherein said absorption heat pump apparatus further comprises a third heat exchanger and a fourth heat exchanger to cool the liquid coolant, said condenser and said third heat exchanger and said fourth heat exchanger for cooling the liquid coolant are operatively connected in parallel with one another through another piping including another means for delivering the liquid coolant, and wherein one of said third heat exchanger or said fourth heat exchanger for cooling the liquid coolant is installed outdoors and the other of said third heat exchanger and said fourth heat exchanger for cooling the liquid coolant is installed indoors, said evaporator evaporating the liquid coolant, and wherein said absorption heat pump apparatus further comprises a fifth heat exchanger and a sixth heat exchanger to absorb heat of the outdoor air by the liquid coolant, said fifth heat exchanger and said sixth heat exchanger for heat absorption of the liquid coolant being operatively connected in parallel with one another with said evaporator through further means for delivering the liquid coolant, and one of said fifth heat exchangers or said six heat exchanger for heat absorption of the liquid coolant being installed outdoors and another of said fifth heat exchanger or said sixth heat exchanger for heat absorption of the liquid coolant being installed indoors.

* * * * *